Nov. 25, 1952  R. H. LAWSON  2,618,794
LASTING MACHINE
Filed Feb. 24, 1949  9 Sheets-Sheet 4

Inventor
Robert H. Lawson
By his Attorney

Nov. 25, 1952 R. H. LAWSON 2,618,794
LASTING MACHINE
Filed Feb. 24, 1949 9 Sheets-Sheet 6
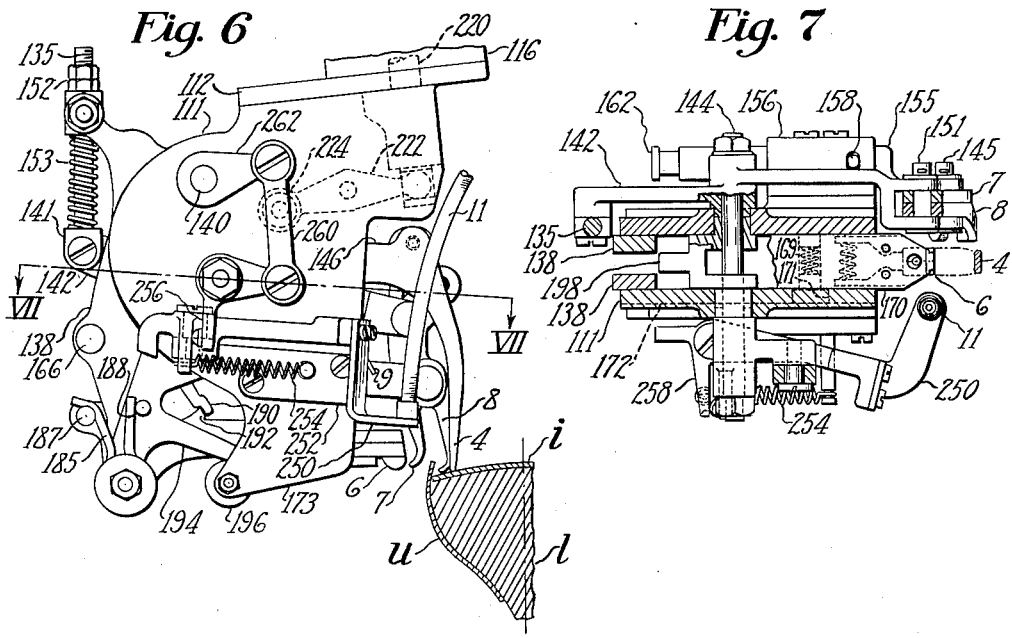
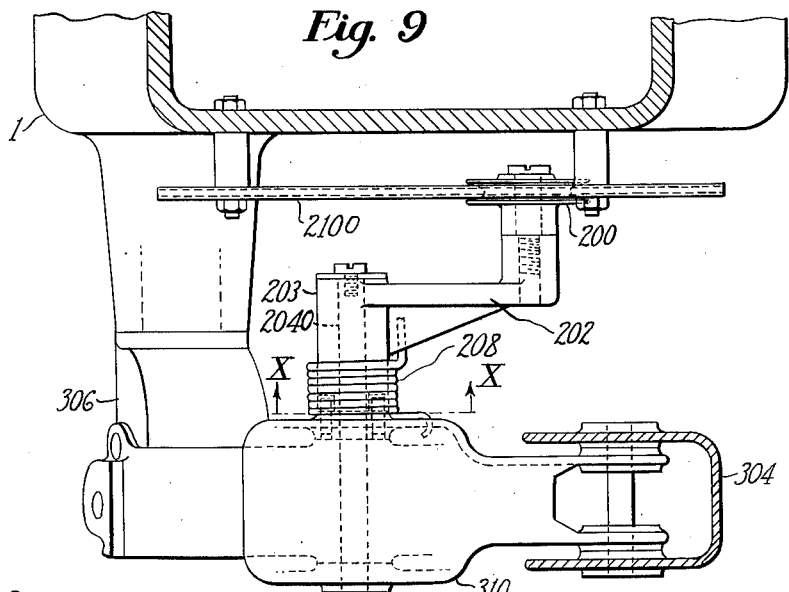
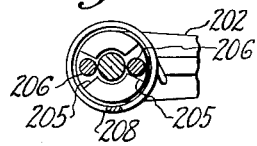
Inventor
Robert H. Lawson
By his Attorney

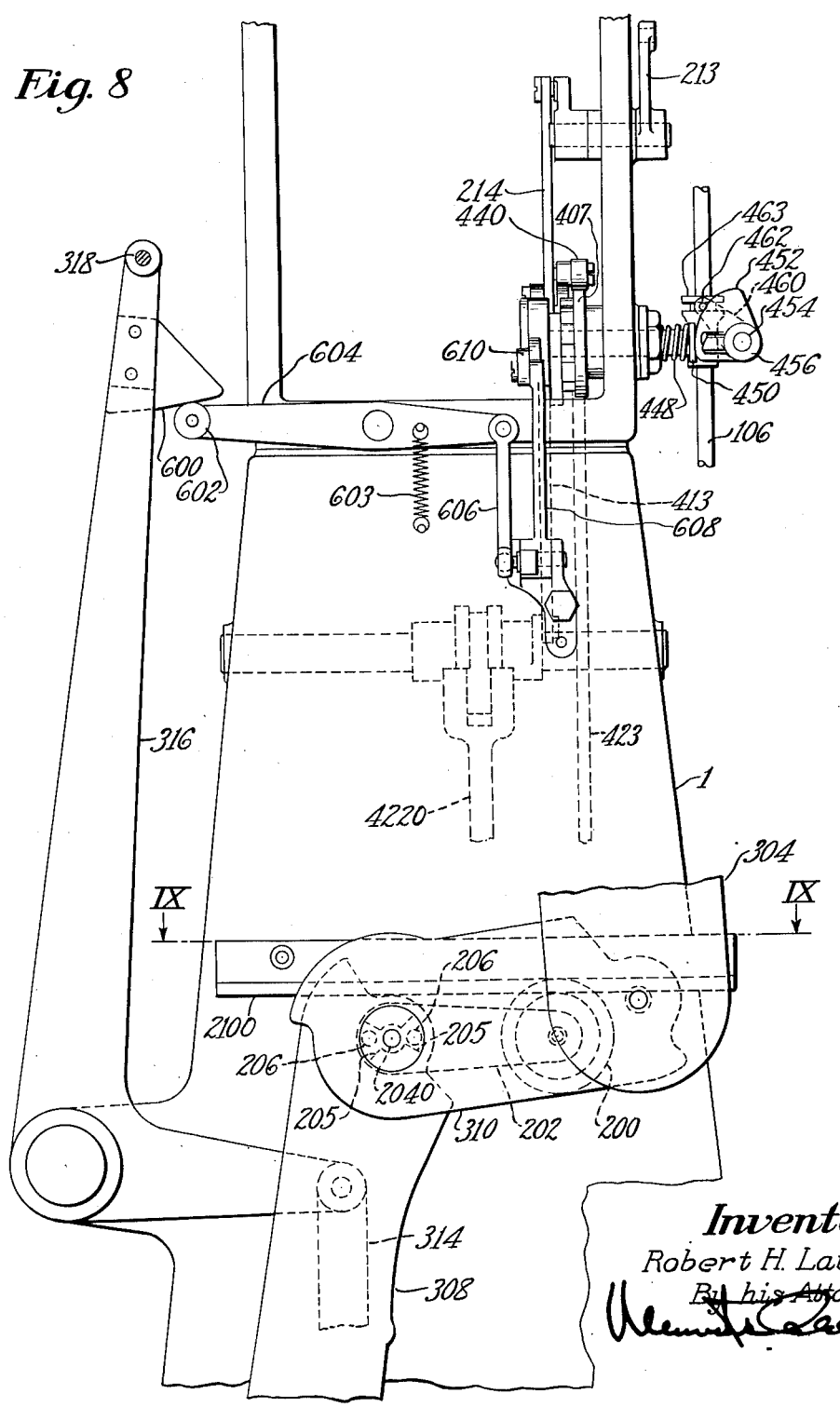

Inventor
Robert H. Lawson
By his Attorney

Nov. 25, 1952  R. H. LAWSON  2,618,794
LASTING MACHINE
Filed Feb. 24, 1949  9 Sheets-Sheet 9

*Inventor*
Robert H. Lawson
By his Attorney

Patented Nov. 25, 1952

2,618,794

UNITED STATES PATENT OFFICE 2,618,794

LASTING MACHINE

Robert H. Lawson, Beverly, Mass., assignor to United Shoe Machinery Corporation, Flemington, N. J., a corporation of New Jersey Application February 24, 1949, Serial No. 78,175

49 Claims. (Cl. 12—10.3)

This invention relates to machines for operating on shoes, and is herein illustrated as embodied in an automatic side-lasting machine of the type disclosed in applicant's prior Patent No. 2,201,866, issued May 21, 1940, and having a pair of lasting devices arranged to operate progressively along the opposite sides of a shoe, supported on a jack. It is to be understood, however, that the several features of this invention are not limited in their utility to use in a lasting machine organization of the exact character exemplified in the aforementioned patent.

In the machine disclosed in this prior patent, as the jack is operated to feed the shoe, the lasting devices are positioned laterally of the shoe by the engagement of so-called guiding-presser feet with the inside faces of the insole ribs, and the shoe is shifted laterally, by mechanism associated with the jack and operated from a pattern cam, to center the longitudinal median line of the shoe bottom relatively to the lasting devices. Also, as is described in said patent, the lasting devices are rotated, by mechanism controlled by other pattern cams, about axes which are perpendicular to the bottom of the shoe, so as to assume proper operative positions with respect to the marginal edge of the shoe; while the shoe itself is tilted, on the jack, by a pattern cam-controlled mechanism to accommodate the heightwise curvature of the shoe bottom. Prior to each feeding movement of the jack, which movement is automatically adjusted in accordance with the size of the shoe, the lasting devices are operated to tension the upper and to secure its lasting margin, on the opposite sides of the shoe, in lasted position to the insole rib by means of staples which are driven through the upper and insole rib and clenched in cavities provided in the guiding presser feet. As will be apparent, this prior machine construction is limited to use in the lasting of shoes having insoles which are provided with ribs, such, for example, as welt shoes, inasmuch as the insole ribs are necessary not only for positioning the lasting devices, laterally of the shoe, as above explained, but also for receiving the fastenings. It is an object of this invention to provide an improved automatic side-lasting machine, of the same general type as that disclosed in the aforementioned patent, which is capable of use for lasting shoes having insoles which are not provided with insole ribs such, for example, as McKay, Littleway, or cement lasted shoes.

With the above object in view, and in accordance with features of this invention, the herein illustrated machine is provided with lasting devices arranged to secure the upper in lasted position directly to the insole itself, as distinguished from fastening the upper to a rib on the insole, by means of suitable fastenings such, for example, as tacks or adhesive, and also with automatic means for varying and determining the positions of the lasting devices, laterally of the bottom of the shoe and relatively to the longitudinal median line of the shoe bottom, as the jack is operated to feed the shoe. In common with the machine of the aforementioned patent and by means of similar pattern cam-controlled mechanism, in the herein illustrated machine the shoe is shifted laterally to center the longitudinal median line of the shoe bottom relatively to the lasting devices, the lasting devices are rotated about axes perpendicular to the bottom of the shoe to assume proper operating positions with respect to the marginal edge of the shoe bottom, the shoe is tilted on the jack to accommodate the heightwise curvature of the shoe bottom, and the feed movements of the jack are automatically adjusted to the particular size of shoe being lasted.

More particularly, the herein illustrated machine is provided with novel lasting devices including upper-tensioning grippers and tack-driving mechanism, which are operated prior to each feeding movement of the jack, and, in accordance with a further feature of this invention, means are provided for automatically discontinuing the feeding of tacks to the tacking mechanism when it is desired to secure the lasting margin of the upper to the insole by means of adhesive as, for example, in the forepart. To facilitate the latter operation, the novel tacking mechanism comprises a nozzle, arranged to wipe the lasting margin of the upper inwardly from the edge of the insole, and a driver adapted to drive a tack, supplied to the nozzle, out of the nozzle and through the upper into the insole. When the feeding of tacks to the nozzle is suspended, this driver is arranged to strike the nozzle a sharp blow which is transmitted to the upper by the nozzle. This hammerlike action of the nozzle augments the adherence of the upper to the insole.

As has been suggested above, a feature of the present invention resides in the provision, in an automatic side-lasting machine of the type here under consideration, of automatic mechanism for varying and determining the positions of the lasting devices laterally of the bottom of the shoe and relatively to the longitudinal median line of the shoe bottom as the jack feeds the shoe. In the herein illustrated machine, this positioning means comprises a cam which is shaped in accordance with the particular style of shoe to be lasted and is based on a selected size of shoe of the full run of sizes to be accommodated. For the purpose of positioning the lasting devices, laterally of the shoe bottom and relatively to the longitudinal center line of shoes of sizes other than the selected base size, means are provided for modifying the effect of the lasting unit positioning cam in accordance with the difference between the base size and the particular size of shoe being lasted. In the herein illustrated machine, this means for modifying the effect of the lasting unit positioning cam comprises mechanism for combining with the displacement of the units, effected directly by the positioning cam, an additional displacement which is proportioned on the size difference; this mechanism including a member which is arranged to be positioned adjustably in accordance with the difference in length, from the toe end to the breast line, between the base size and the size of the shoe being lasted. Conveniently, and as herein illustrated, this member is adjusted by movement of the jack in a direction extending lengthwise of the shoe thereon, to aline the breast line of the shoe with the lasting units, and is thereafter locked in adjusted position when the machine is treadled to start the lasting operation, this same movement of the jack serving also to set the feed mechanism, which is likewise locked when the machine is treadled, as in the machine of the above-mentioned patent.

The above and other objects and features of this invention will be apparent from the following detailed description of the preferred embodiment thereof which is illustrated in the accompanying drawings, and will be pointed out in the claims.

In the drawings,

Fig. 6 is a view in side elevation of the right-hand lasting unit of Fig. 3, as viewed from the side opposite to that in which it is shown in Fig. 3;

Fig. 7 is a plan view of the lasting unit shown in Fig. 6 with certain parts in section on line VII—VII of Fig. 6;

Fig. 8 is a view in front elevation of a portion of the machine shown in Fig. 1 with certain parts of the jack structure broken away and with the lasting units omitted;

Fig. 9 is a view in section on line IX—IX of Fig. 8;

Fig. 10 is a sectional view of a portion of the jack structure taken on lines X—X of Fig. 9, and looking in the direction of the arrows;

Figure 1:
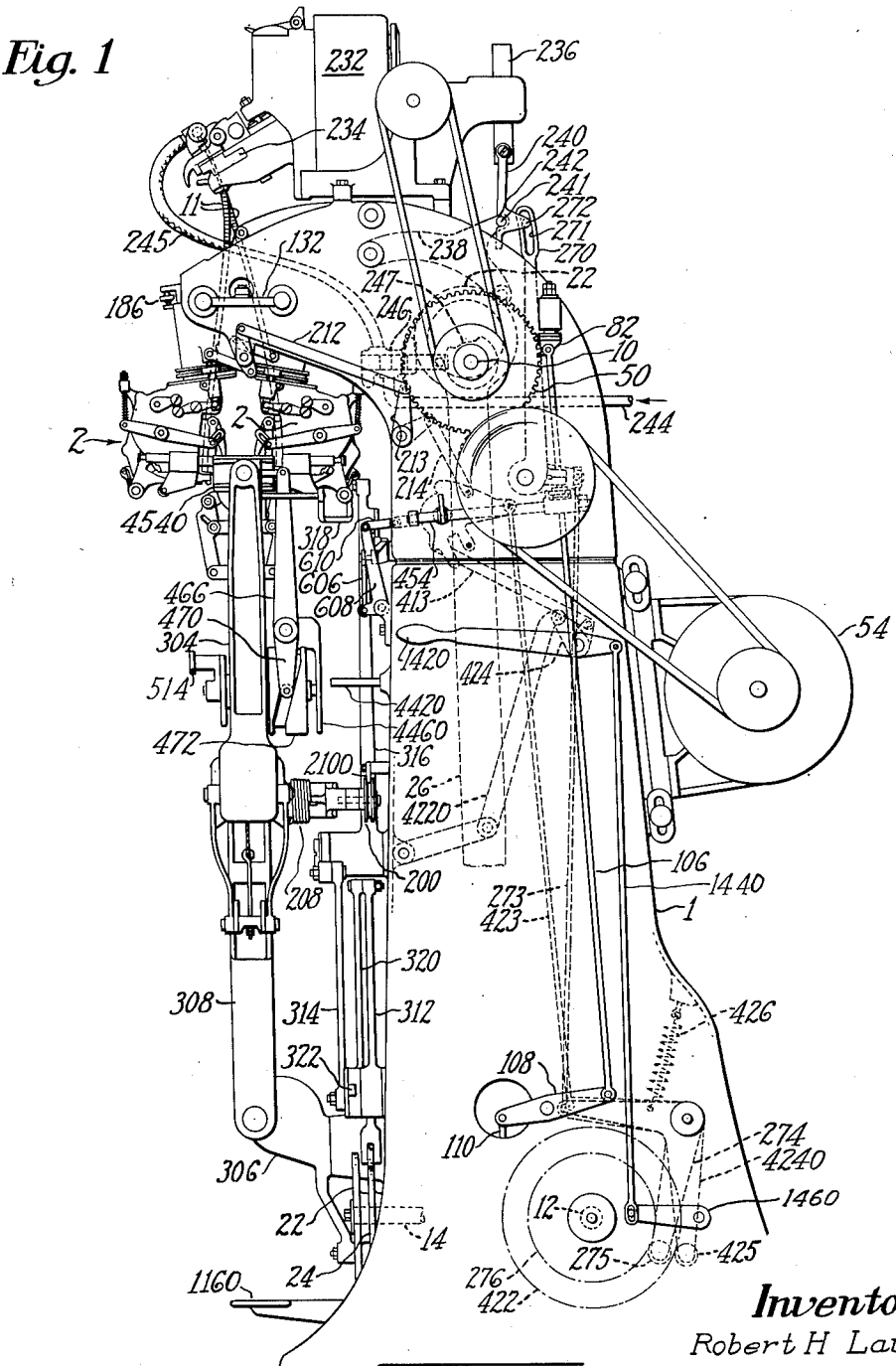
Fig. 1 is a view in side elevation of an automatic side-lasting machine embodying the features of this invention.

Referring to the drawings, the construction and mode of operation of the machine therein illustrated are, with the exception of the lasting devices, the means for positioning these devices laterally of the shoe and a change in the jack mechanism, the same as the machine disclosed in the aforementioned patent. It will, therefore, be necessary in this specification, to describe in detail only these lasting devices, together with their operating mechanism, the mechanism for positioning these devices laterally of the shoe bottom, and the change in the jack mechanism, inasmuch as reference may be made to the prior patent for a description of the construction and mode of operation of the other mechanisms which are the same in both machines.

Figure 2:
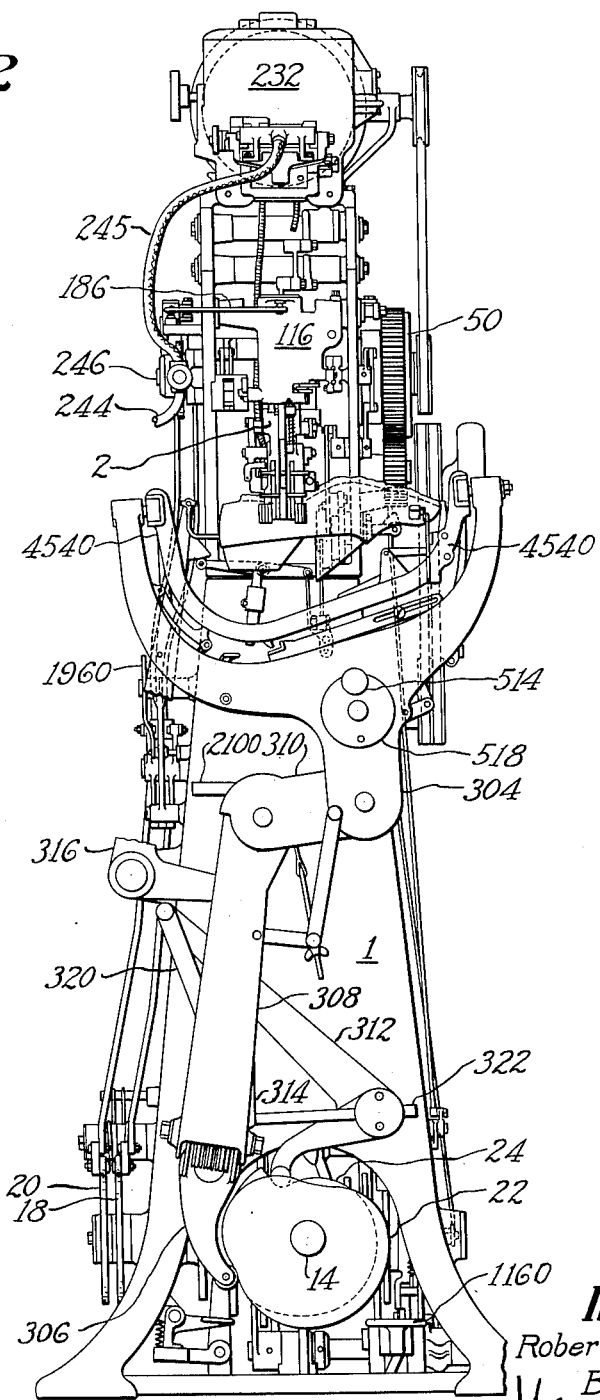
Fig. 2 is a view in front elevation of the machine shown in Fig. 1.

In common with the machine of the prior patent, the machine illustrated in these drawings comprises a pair of lasting units, indicated generally by the reference character 2, adapted to operate on the opposite sides of the bottom of a shoe supported on a jack including a jack frame 304, which, together with the lasting units, is associated with a main frame 1, Figs. 1 and 2. The lasting units are operated from an operating cam shaft 10, driven from an electric motor 54 through a main gear 50, and this operating cam shaft also carries an eccentric 22 for actuating an oscillating and longitudinally moving lever 26 which, by means of mechanism similar to that of the prior patent, effects a partial rotation, or indexing, of a pair of pattern cam shafts 12 and 14, located in the lower portion of the frame 1, for each complete rotation of the operating cam shaft 10. A clutch, having an operating arm 82, is provided for connecting the operating cam shaft 10 to the constantly driven gear 50, and this arm is connected to a starting treadle 1160 by means of a rod 106, lever 108 and rod 110. As in the prior machine, the mechanism for indexing the pattern cam shafts 12 and 14 includes means for automatically disengaging the aforementioned clutch, at the completion of the lasting operation and after the pattern cam shafts have completed a full turn. A hand lever 1420 is arranged to operate this last-mentioned means, through a rod 1440 and a lever 1460, when it is desired to stop the machine manually.

The supporting structure for the jack frame 304, Figs. 1, 2, 8 and 9, comprises a base 306 provided with an upwardly extending arm 308 and a horizontally extending link 310, one end of which is pivotally connected to the upper end of the arm 308 and the other end of which is pivotally connected to, and supports the jack frame 304. The base 306 is pivotally mounted upon the lower portion of the machine frame to swing about an axis extending transversely to the direction of feed and substantially parallel with the plane of the bottom of the shoe supported on the jack, and the pivots connecting the link 310 with the arm 308 and with the jack frame are parallel with the axis of the base 306. Thus the jack frame is supported firmly in position, but can be readily moved to feed the shoe and also to maintain the shoe in proper position with relation to the lasting devices at all times.

Feeding movements are imparted to the jack frame 304 through connections actuated by a pattern cam 24, on the shaft 14. These connections comprise a cam lever 312, a link 314 having its lower end adjustably connected to the lever 312, in a manner described in the prior patent, and having its upper end connected to the horizontal arm of a bell crank 316, and a link 318 connecting the vertical arm of the bell crank to the jack frame 304. In order to vary the extent of the individual feeding movements for shoes of different sizes, means are provided for adjusting the distance from the pivot of the cam lever 312 of the lower end of the motion transmitting link 314. This means includes a supporting link 320 pivotally connected at its lower end to the link 314 and pivotally mounted at its upper end on the lever 312 in a position to cause a swinging movement of the link 320 about its pivot to move the lower end of the link 314 toward or away from the pivot of the cam lever 312. As will be understood by reference to the prior patent, the supporting link 320 is locked in a position of adjustment to which it is moved when the shoe is presented to the lasting devices by means of a locking rod 322 and means operated when the treadle 116 is depressed to initiate the lasting operation. Longitudinal tipping movements of the shoe about a transverse axis, passing through the points of operation of the lasting devices, are imparted to the jack by the direct engagement of a pattern cam 22 with an arm projecting downwardly from the base 306 of the jack-supporting structure.

In the machine of the prior patent, the jack frame supporting structure is free to move, during the lasting operation, in a direction extending widthwise of a shoe on the jack. However, for the purposes of this invention, which will appear below, means are provided in the herein illustrated machine for preventing such lateral movement of the jack during the lasting operation. This means comprises a grooved roll 200 which is carried by an arm 202, having a hub 203 that is journaled on a shaft 2040, forming part of the jack-supporting structure, see Figs. 8 and 9. This hub has two oppositely disposed recesses 205, 205 which receive two pins 206, 206 carried by the link 310, Fig. 10, and a coil spring 208, surrounding the hub 203, is anchored at one end on the link 310 and at its other end on the arm 202. This arrangement is such that when the jack is in operative position, as shown in Figs. 1, 2, 8 and 9, the grooved roll 200 engages a guide rail 2100, mounted on the machine frame, and thus lateral movement of the jack supporting structure, including the jack frame 304, is prevented. However, when the jack frame is depressed, at the completion of the lasting operation and by mechanism similar to that in the machine of the prior patent, the arm 202 will be rotated in a downward direction, Fig. 8, by the engagement of pins 206, 206 with the sides of recesses 205, 205, so as to disengage the roll 202 from the rail 2100, thus permitting the jack to be moved outwardly by a plunger 4420 which engages a plate 4460 on the jack and is operated in the manner explained in the prior patent. When the jack is again swung inwardly, the roll 200 will engage the rail 2100 as the jack is elevated to its operating position.

The shoe being lasted is supported on the jack frame 304 by means of a cradle 4540 which, as in the prior machine, is shifted transversely of the jack frame to center the median line of the shoe bottom relatively to the two lasting units, Figs. 1 and 2. The mechanism for thus shifting the cradle includes a lever 466 having an arm 470 provided with a cam roll that engages a cam 472, Fig. 1. This cam is rotated, as the jack is operated to feed the shoe relatively to the lasting units, and shifts the cradle laterally of the jack frame. For rotating the cam 472, in order to bring another portion of its cam track in engagement with the roll on the arm 470, thus to accommodate the lateral movement of the shoe on the jack frame, for right and left shoes, a handle 514 is provided and this handle has a plunger adapted to enter one of two holes in a plate 518. The handle 514 is connected to the cam 472, while the plate 518 is connected to the means for rotating the cam.

Figure 3:
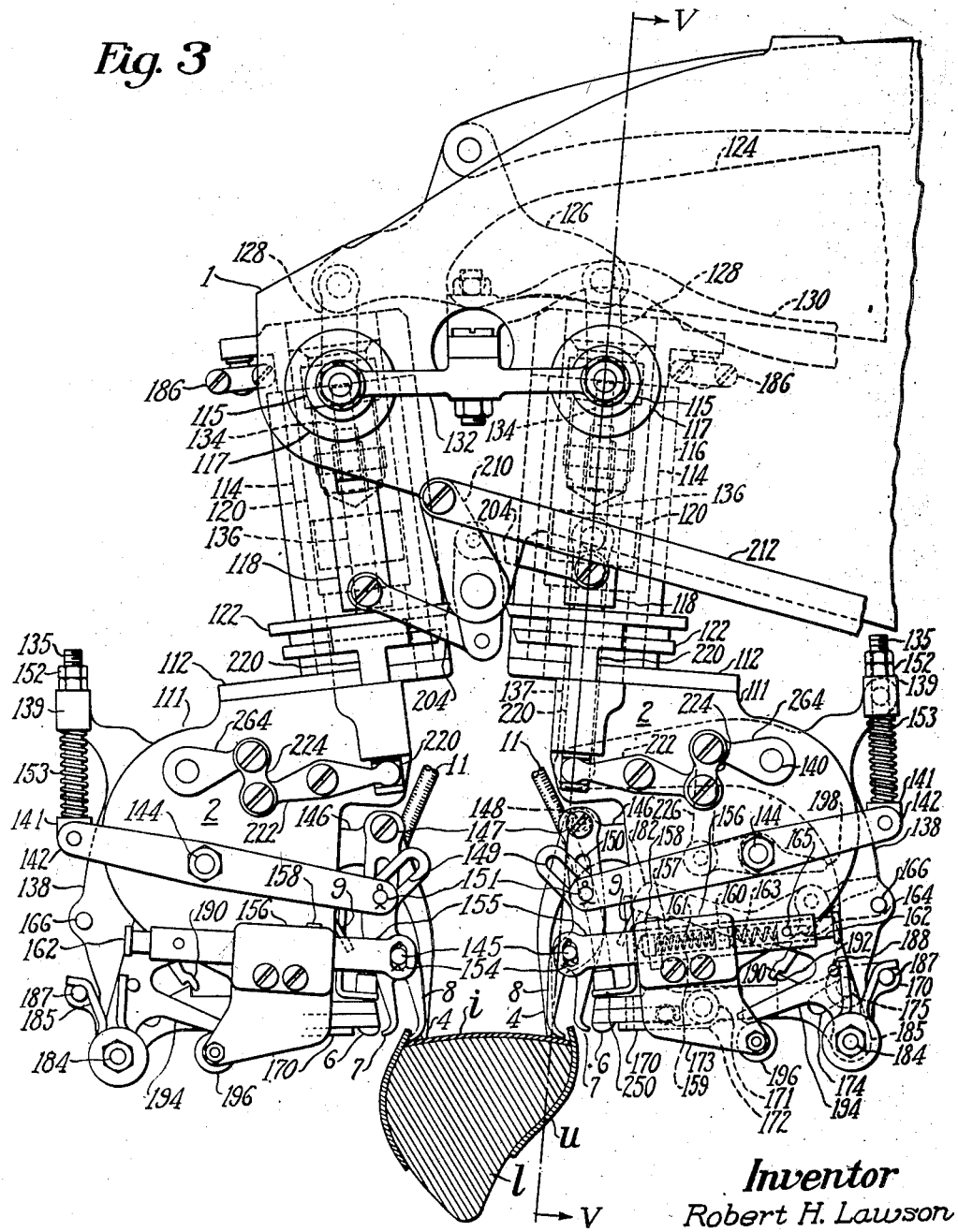
Fig. 3 is a view in side elevation, and at an enlarged scale, of the lasting units of the machine shown in Fig. 1.
Figure 4:
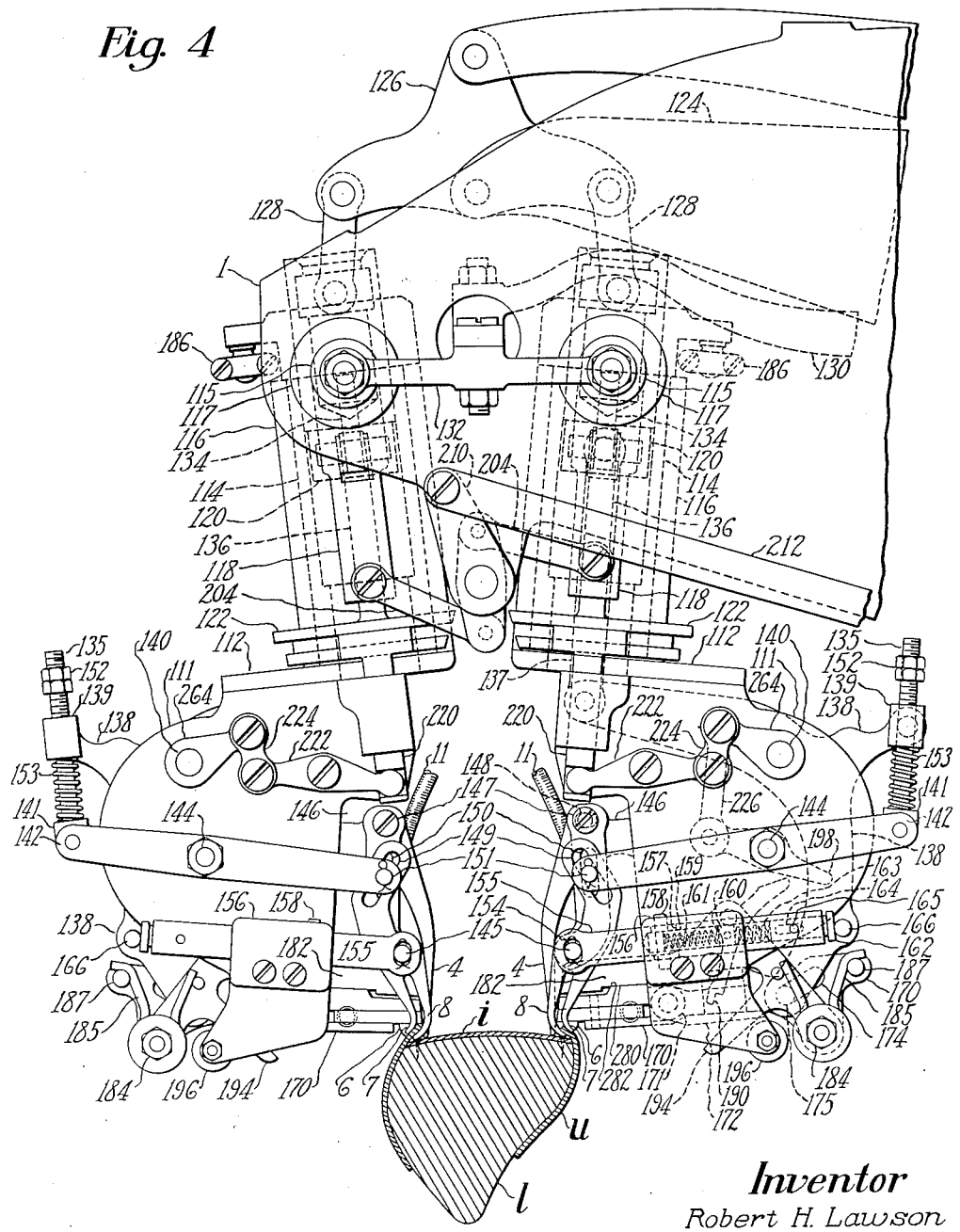
Fig. 4 is a view similar to that of Fig. 3 but showing the parts of the lasting units in different operating positions.

The lasting units 2, 2 are supported for pivotal movement, toward or away from each other, and for rotary movement about the vertical axes, substantially perpendicular to the bottom of a shoe supported on the jack, as in the prior machine, the means for rotating the units, including a pair of links 186, 186, see Figs 3 and 4, and the means for moving the units toward or away from each other, including links 204, 204, bell crank 210 and a link 212. As will be understood by reference to the prior patent, the lasting units are rotated, by means of mechanism controlled by pattern cams 18, 20 on the shaft 12, so as to position the units in proper operative relation to the marginal edge of the shoe bottom at the instant point of operation, and this mechanism includes means, including a hand lever 1960, for reversing the connections from these two pattern cams to the two links 186, 186 for accommodating right or left shoes, see Fig. 2. As will presently be explained, in the herein illustrated machine, the lasting units are automatically moved toward or away from each other, to position them laterally of the shoe bottom and relatively to the longitudinal median line of the shoe bottom, by novel means including cam-operated mechanism having a member which is adjustable to change the lateral position of the units in accordance with variations in width of shoes of different sizes.

Referring now to Figs. 3, 4, 5 and 6 of the drawings, each of the two lasting units comprises a shoe-bottom-engaging foot 4, a gripper, including jaws 7 and 8, a tack nozzle 6, a tack driver 9 and a tack-delivering tube 11. These parts are supported on a pair of side plates 111 that are secured to a cross member 112 which is formed integrally with a hollow hub portion 114. These hub portions are journaled in sleeves 116 which are pivotally mounted on hollow trunnions 115, journaled in bosses 117 formed in an overhanging portion of the machine frame, and the links 204, by means of which the lasting units are moved toward and away from each other, are connected to rectangular bosses 118 on these sleeves. For operating each of the lasting devices a pair of slides 120, 122 are provided, the slide 120 being mounted within the hub portion 114 while the slide 122 is mounted on the outside of the sleeve 116. The two slides 120 are operated from a cam on the operating cam shaft 10 by means of a lever 124, crosshead 126 and links 128, 128; while the two slides 122, 122 are similarly operated from another cam of the operating cam shaft by means of a lever 130, crosshead 132, bell-crank levers 134, 134 and plungers 136, 136.

Inasmuch as both of these lasting devices are of the same construction, with the parts reversed to adapt one to one side of the shoe and the other to the opposite side, it will be necessary to describe only one of them in detail. Referring particularly to the lasting unit which appears on the right-hand side of Figs. 3 and 4 of the drawings, the slide 120 is connected by means of a link 137 to a lever 138, pivotally supported on a cross shaft 140 which extends through the two side plates 111, and this lever is provided with an offset portion on which is supported a thrust block 139. Passing through this block is a rod 135, formed integrally with a second thrust block 141 which is pivotally connected to the end of a lever 142 that is supported on the outer face of one of the plates 111 by means of a stud 144. The gripper jaws 7 and 8 are hinged together by means of a pin 145 and are supported on a fixed arm 146, carried between the two side plates 111, 111, by means of a screw 147 which passes through a slot 148 in the upper end of the jaw 8 and is threaded into the aforementioned arm. These jaws are provided with angularly disposed slots 149, 150 through which a pin 151, carried by the lever 142 projects. The rod 135 is threaded to receive stop nuts 152 and a compression spring 153 surrounding this rod is interposed between the two blocks 139 and 141.

When the slide 120 is elevated, the lever 138 will be turned in a direction to cause the end of the lever 142, carrying the pin 151, to be elevated so that the jaws 7 and 8 will be yieldingly closed on material between them, e. g., the lasting margin of the upper $u$, assembled on a last $l$, by the action of the pin 151 in the slots 149, 150 and the spring 153. The pin 145, which connects the two jaws 7 and 8 as has already been explained, also projects through a slot 154 formed in the end of a rod 155. The rod 155 is slidably mounted in a block 156, which is secured to one of the side plates 111, and is provided with a cross slot 157 through which a pin 158, carried by the block 156, projects. Received within a bore 159 in this rod, and interposed between the pin 158 and a plug 160, secured to the rod, is a relatively light compression spring 161 which tends to hold the rod 155, together with the gripper jaws 7 and 8, in the positions as shown in Fig. 3 of the drawings. Also received within the bore 159, and interposed between the opposite side of the plug 160 and a plunger 162, is a heavier compression spring 163. The plunger 162 is slotted at 164 and a pin 165, fixed to the rod 155, passes through this slot. The lever 138 carries a pin 166 which, during the continued movement of the lever 138, after the jaws 7 and 8 have been closed, engages the plunger 162 and, through the action of the spring 163, moves the jaws 7 and 8 in a direction to cause them to draw the lasting margin of the upper $u$ inwardly from the edge of the bottom of the last and over an insole $i$ thereon, see Fig. 4, thereby to effect a tensioning of the upper $u$ over the last $l$.

The tack nozzle 6 is carried by a slide 170 which is provided with a roll 171 fitted in a cam groove 172, formed in a depending portion 173 of the side plate 111. At its rearmost end, this slide is formed with an inclined slot 174 through which a pin 175, carried by the lever 138, projects. During the movement of this lever to close the gripper jaws, this pin moves along the slot 174 thereby effecting a swinging movement of the slide 170, about the axis of the roll 171, in a direction to lower the nozzle 6 to its operative position substantially in the plane of the shoe bottom, longitudinal movement of the slide being momentarily prevented by the frictional engagement of roll 171 with the bottom of groove 172 against which it is held by a spring 169, Fig. 7. Now, as this pin reaches the end of the slot 174, it will move the slide 170 in a direction to carry the nozzle inwardly over the shoe bottom. During this continued movement of the lever 138, the gripper jaws are moved in a direction to draw the lasting margin inwardly over the shoe bottom, as has already been explained, and the arrangement is such that the nozzle 6 actually follows this inward movement of the gripper jaws and lays the lasting margin of the tensioned stock against the insole $i$. At the conclusion of these operations of the gripper jaws and nozzle, the tack is driven to secure the lasting margin of the tensioned upper in lasted position to the insole, by mechanism about to be described. When the nozzle is retracted, by a reverse movement of the lever 138, the pin 175 will travel along the slot 174 and swing the slide 170 in a direction to elevate the nozzle 6 away from the overlasted margin before the slide 170 is retracted to the position shown in Fig. 2.

The mechanism for driving a tack, through the nozzle 6, to secure the lasting margin of the upper to the insole in lasted position, comprises the driver 9 which is mounted on a hammer arm 182. This hammer arm is pivoted on a downwardly extending portion of the slide 170 by means of a bolt 184 and a coil spring 185, surrounding this bolt, has one of its ends in engagement with a pin 187, on the slide 170, and its opposite end in engagement with a pin 188 on the hammer arm. A latch 190, pivoted on the hammer arm, is arranged to engage a tooth 192, formed on the slide 170, to hold the hammer arm in the cocked position, as shown in Fig. 3, to which the hammer arm is moved, when the slide 170 is retracted, by the engagement of a finger 194, formed integrally with the hammer arm, with a roll 196 which is carried by the downwardly extending portion 173 of the plate 111. When the lever 138 is operated to move the slide to the left in Fig. 3, as above explained, the upper end of the latch 190 is brought directly beneath one end of a lever 198 which is connected to the slide 122 by means of a plunger 220, lever 222, and links 224, 226. At the proper time in the operating cycle, the slide 122 is elevated, by the cam on the operating cam shaft, thus causing the lever 198 to trip the latch 190 and release the hammer arm 182 for downward movement, by means of the spring 185, to project the driver 9 through the nozzle 6 and thereby to drive a tack therefrom into the lasting margin of the upper and insole.

Tacks are supplied to the nozzle 6 through the flexible tubes 11 which are connected to a tack-distributing mechanism of well-known construction, see, for example, United States Letters Patent No. 663,777, granted on December 11, 1900, on an application filed in the name of Ronald F. McFeely, supported on the top of the machine frame and including a tack pot 232, distributor slide 234 and distributor operating rack 236. The rack 236 may be operatively connected to the distributor slide 234 in any convenient manner as, for example, by means of two shafts, not shown, joined by a universal joint and geared, respectively, to the rack 236 and to the distributor slide 234 (see elements 59, 60, 61 and 63 in Fig. 1 of United States Letters Patent No. 1,168,463, granted January 18, 1916, on an application filed in the name of Arthur Bates). This rack is actuated from a cam on the operating cam shaft 10 by means of a lever 238 which is connected to the rack by a link 240 having a notch 242 which is adapted to engage a pin 241 on the lever 238. With these parts in the positions shown in Fig. 1, the arrangement is such that during each complete rotation of the operating cam shaft 10, and at the proper time in the operating cycle of the lasting units, tacks are delivered to the nozzles 6. For the purpose of assuring the delivery of these tacks to the nozzle 6 through the tubes 11, compressed air is admitted to the upper ends of these tubes through pipes 244, 245, under the control of a valve 246 which is operated by a cam 247 carried by the operating cam shaft 10.

Figure 5:
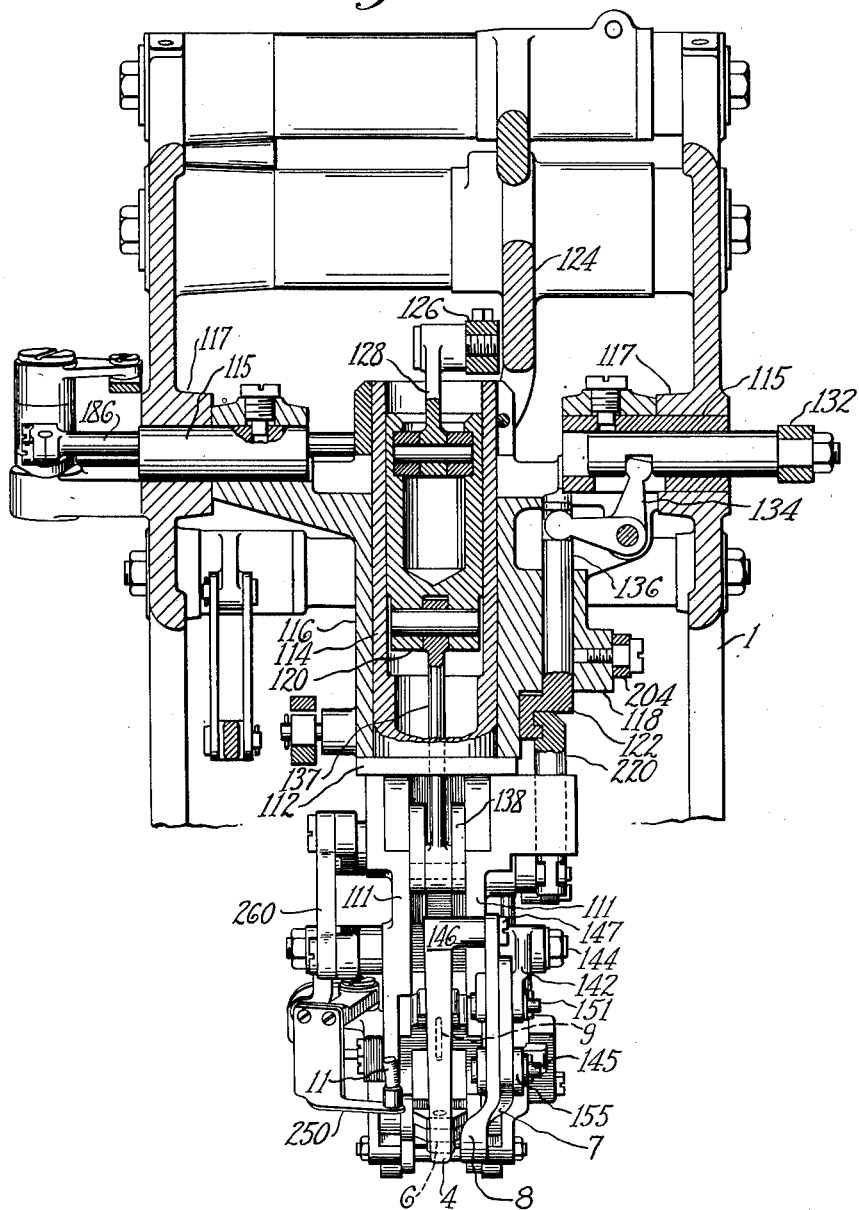
Fig. 5 is a view, in section substantially on line V—V, Fig. 3, of one of the lasting units.

Referring to Figs. 5, 6 and 7 of the drawings, the lower end of each of the tubes 11 is supported on an arm 250 which is pivotally mounted on a bracket 252, secured to a side plate 111, and a coil spring 254 is arranged to urge this arm yieldingly in a direction to aline the tube 11 with the nozzle 6. However, except at the instant a tack has been separated and admitted to the tube 11, for delivery by the compressed air blast to the nozzle 6, the arm 250 is held in the retracted position in which it is shown in Fig. 7, by means of one end of a bell-crank lever 256 which engages a finger 258 on the hub of the arm 250. This bell-crank lever is connected by means of a link 260 to an arm 262 fast on the shaft 140, and a second arm 264, likewise fast on the shaft 140, is connected to the link 224. At the proper time in the operating cycle of the lasting unit, the slide 122 is moved vertically, prior to its subsequent movement for tripping the latch 190, to effect movement of the bell-crank lever 256 away from the finger 258 a sufficient distance to allow the spring 254 to swing the arm 250 into position for delivery of a tack to the nozzle 6. It will be understood that, during this first operation of the slide 122, the slide 170 is retracted so that the latch 190 is out of range of the tripping lever 198.

As has previously been suggested, means are provided for automatically discontinuing the feeding of tacks to the nozzles 6 when it is desired to secure the lasting margin of the upper to the insole by adhesive, as for example in the forepart of the shoe. In the herein illustrated machine, the mechanism for accomplishing this result comprises a bell-crank lever 270 having an arcuate slot 271 which is adapted to engage a pin 272 carried by the link 240, Fig. 1. This lever is connected by means of a rod 273 to a bell-crank lever 274 one end of which carries a roll 275 which is in engagement with a pattern cam 276 on the pattern cam shaft 12. This cam, which is diagrammatically shown in Fig. 1, is so shaped that, when the lasting operation has proceeded substantially to the ball line of the shoe, the lever 270 will be swung, in a clockwise direction, so as to disengage the link 240 from the pin 241 and thus to stop the delivery of tacks by the separator 232 to the tubes 230.

In order to facilitate the adherence of the lasting margin of the upper to the insole, when the delivery of tacks is arrested, as above explained, the hammer arm 182 is provided with a surface 280 which is adapted to strike a surface 282 formed on the slide 170, Fig. 4. Thus, the nozzle 6 is forcibly driven against the lasting margin of the stock with a hammerlike action and the upper material is thereby firmly pressed against the insole.

It will be readily understood, by reference to the prior patent, that the two lasting units are operated once for each feeding movement of the jack so that the upper is tensioned, and secured in lasted position either by a tack or by adhesive, at points spaced along the opposite sides of the bottom of the shoe; the lasting operation beginning at the breast line and finishing substantially at the tip line. Also the feeding increments of the jack are varied, in accordance with the length of the shoe, between breast line and tip line, for different sizes of shoes. During the lasting operation, the shoe is leveled by the engagement of the guide presser feet 4, 4, each of which is formed integrally with the fixed arm 146, with the insole adjacent to the opposite sides of the shoe bottom.

Turning now to the mechanism for positioning the lasting units laterally of the shoe and relatively to the longitudinal center line of the shoe bottom, as the lasting operation proceeds, it has already been explained that the lasting units are moved toward and away from each other by mechanism including a link 212, and also, during the feeding action of the jack, that the shoe is shifted laterally relatively to the two lasting units, so as to maintain the longitudinal median line of the shoe bottom substantially in line with a vertical plane midway between the two units, by mechanism similar to that disclosed in the prior patent and including means for changing the lateral movement of the jack to accommodate right and left shoes.

Figure 11:
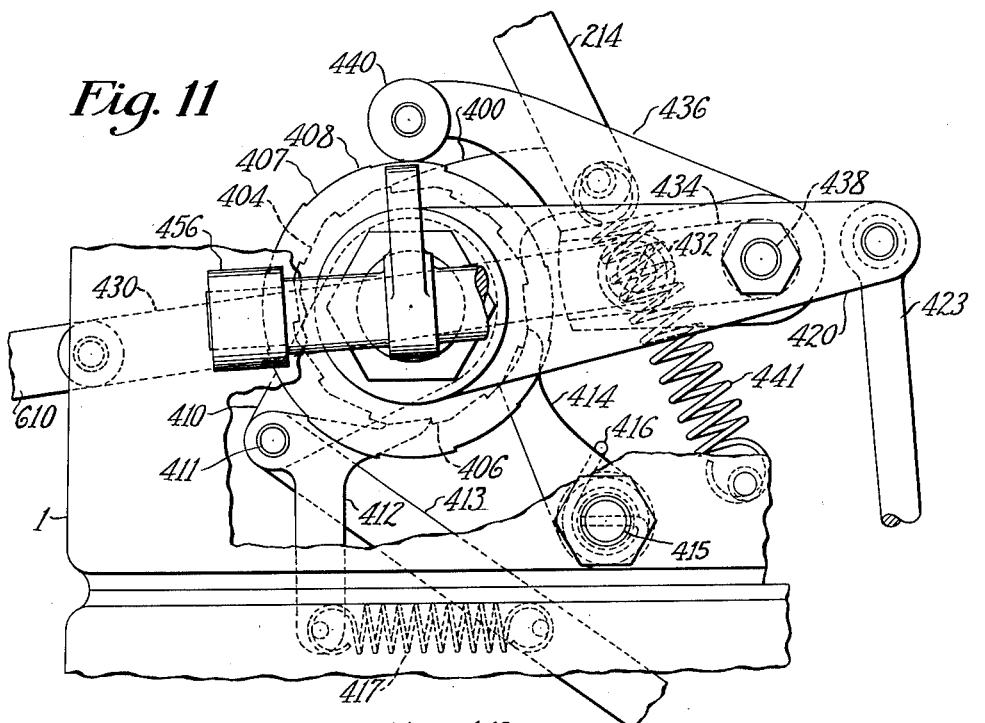
Fig. 11 is a view in side elevation of an operating mechanism forming part of the machine shown in Fig. 1.
Figure 12:
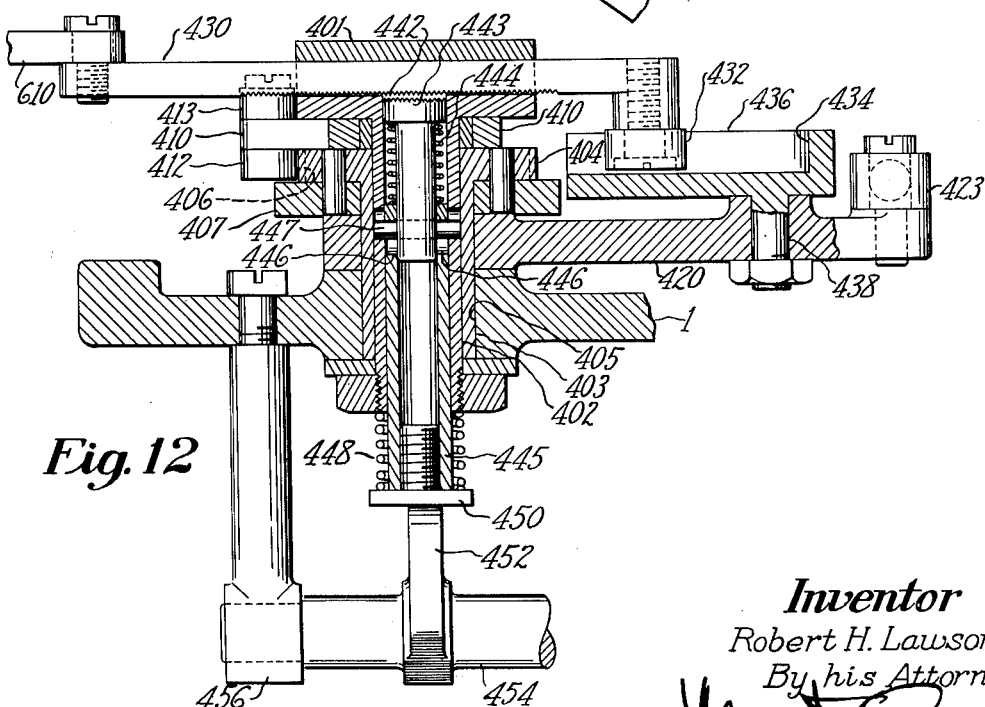
Fig. 12 is a plan view of the mechanism shown in Fig. 11 with certain parts in section.

Referring to Figs. 1, 11 and 12, the link 212 is operated, through a bell-crank lever 213, by means of a second link 214 which is connected to an arm 400, formed integrally with a block 401 which has a hollow hub portion 402. This hub portion is journaled in a sleeve 403 which is provided with a flange 404 and journaled in a bore 405 formed in a portion of the machine frame 1. The flange 404 is provided with a circumferential series of ratchet teeth 406 and secured thereto is a cam plate 407 formed with a circumferential series of cam surfaces 408. Rotatably mounted on the hub 402, adjacent to the block 401, is an arm 410 and secured to this arm, by means of a pin 411, is a ratchet arm 412, adapted to engage the teeth 406, and also a link 413. A pawl 414, pivotally supported on a stud 415, carried by the frame 1, is urged into engagement with the teeth 406 by means of a coil spring 416. Likewise, a coil spring 417 is arranged to hold the ratchet arm 412 yieldingly against the teeth 406.

An arm 420 is rotatably mounted on the sleeve 403 and this arm is connected to a unit-positioning pattern cam 422 carried by the pattern cam shaft 12, by means of a link 423, bell-crank lever 4240 and cam roll 425; a spring 426 being arranged to hold the roll 425 against the cam 422, Fig. 1. The movements of the arm 420, which is operated directly from the pattern cam 422, shown diagrammatically in Fig. 1, are imparted to the arm 400, and then through the links 212, 214, to the lasting units, in the following manner. A bar 430, slidably carried by the block 401, is provided with a roll 432 which rides in a groove 434 formed in an arm 436. This arm is pivotally mounted on the arm 420, by means of an integrally formed stud 438, and is provided with a roll 440 which rides on the cam plate 407, a coil spring 441, acting on the arm 409, serving to hold the roll 440 against this cam, through the action of roll 432 in the groove 434. The bar 430 is formed with serrations 442 and is adapted to be locked against sliding movement in the block 401, by means of a serrated plug 443, when this plug is freed for movement toward the bar, under the action of a coil spring 444, by the inward movement of a sleeve 445 which is provided with slots 446 that engage a pin 447 carried by the plug. This sleeve is normally withdrawn, by means of a spring 448, in order to hold the plug out of engagement with the teeth 442 on the bar 430.

The link 413 is connected to a bell-crank lever 424 (Fig. 1) which is oscillated by means of a link 4220, connected to the lever 26, once for every complete rotation of the operating cam shaft 10 so that, through the action of the ratchet arm 412, and pawl 414, a different cam surface 408 will be brought into engagement with the roll 440. These cam surfaces 408 are concentric with the center of the cam disk 407 but at different distances therefrom. Thus, as the cam 407 is rotated, the arm 436 will be swung, more or less, and through the action of the roll 432, the arm 400 will be shifted relatively to the arm 420. As will be apparent, this shifting of the arm 400, relatively to the arm 420, will modify the effect of the pattern cam 422 in positioning the lasting units.

The sleeve 445 has a head 450 which rides against a cam 452 carried by a shaft 454. This shaft is journaled in bearing studs 456, supported on the machine frame, and secured to this shaft is a lever 460 provided with a pin 462 that engages a grooved collar 463 carried by the treadle rod 106, Fig. 8. The cam 452 is so shaped that when the treadle 116 is depressed, to start the machine, the sleeve 445 will be moved inwardly, toward the serrated plug 443, so that this plug will be free to be moved, by the spring 444, into locking engagement with the teeth 442 on the bar 430. However, when the treadle is released at the completion of the operating cycle of the machine, the sleeve 445 will be moved outwardly, by spring 448, thus withdrawing the plug 443 out of locking engagement with the bar 430.

It will be apparent, when the bar 430 is so positioned that the axis of the roll 432 is in alinement with the axis of the stud 438, that the action of the several cam surfaces 408, on the cam 407, will have no effect at all on the positioning function of the pattern cam 422, inasmuch as the swinging of the arm 436 will have no effect on the position of the arm 400 relative to the arm 420. However, when the bar 430 is shifted so as to move the axis of the roll 432 away from the axis of the stud 438, the positioning effect of the pattern cam 422 will be modified in the manner which has already been explained. It will be observed, with the arrangement herein shown, that this modifying action is in a sense to subtract from the positioning effect of the pattern cam 422 and move the units closer together. It will also be noted that the more the bar 430 is shifted to move the roll 432 away from the stud 438, the greater will be the resulting modifying of, or subtraction from, the positioning effect of the pattern cam. This action of the mechanism is utilized so as to vary the positioning effect of the pattern cam in accordance with the difference between the base size and a particular size being lasted, by adjustably positioning the bar 430 in accordance with the difference in length between the base size and the size of the shoe being lasted.

As in the machine of the prior patent, after the shoe to be lasted has been placed on the jack, the jack is swung into operative position beneath the lasting units and then the shoe, together with the jack, is moved in a direction lengthwise of the shoe until the breast line of the shoe is brought into alinement with the lasting instrumentalities, and this lengthwise movement of the jack is utilized, in the herein illustrated machine, adjustably to position the bar 430.

The arm 316 is provided with a cam plate 600 which engages a roll 602 carried by a lever 604 which is pivotally mounted on the machine frame and is urged in a direction to hold the roll 602 against the cam by means of a spring 603, Fig. 8. This lever is connected, by means of a link 606, to a bell-crank lever 608 which, in turn, is connected to the bar 430 by means of a link 610. Thus, as the shoe is moved in a lengthwise direction, to aline its breast line with the lasting instrumentalities of the two lasting units, the bar 430 will be shifted, in the block 401, the treadle 116 at this time being elevated so that the bar 430 is free for movement by the link 610. As will be apparent, the smaller the size of the shoe, the greater will be the movement of the jack, to the left in Fig. 8, necessary to bring its breast line into alinement with the lasting units, and the farther the bar 430 will be shifted to move its roll 432 away from the stud 438. Accordingly, the positioning effect of the pattern cam 422 will be modified, and this modifying action will be varied in accordance with the size of the shoe being lasted. As has already been explained, after the shoe has been properly located, relatively to the lasting units, when the treadle 116 is depressed, the bar 430 will be locked in adjusted position.

Figure 13:
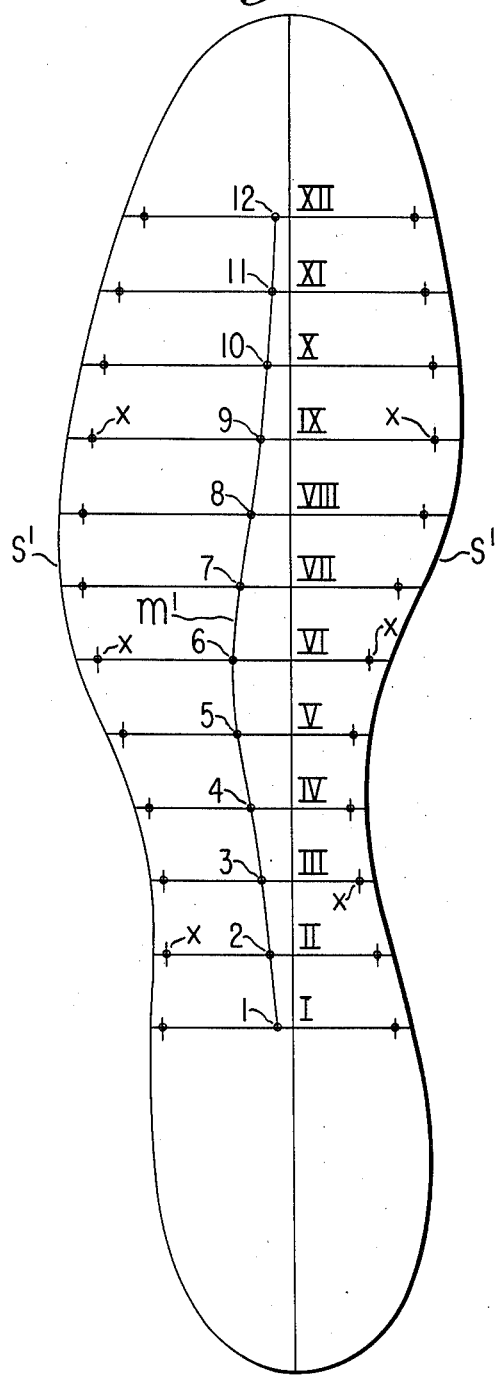
Figs. 13 and 14 are diagrammatic views illustrating the operation of the machine on shoes of different sizes.
Figure 14:
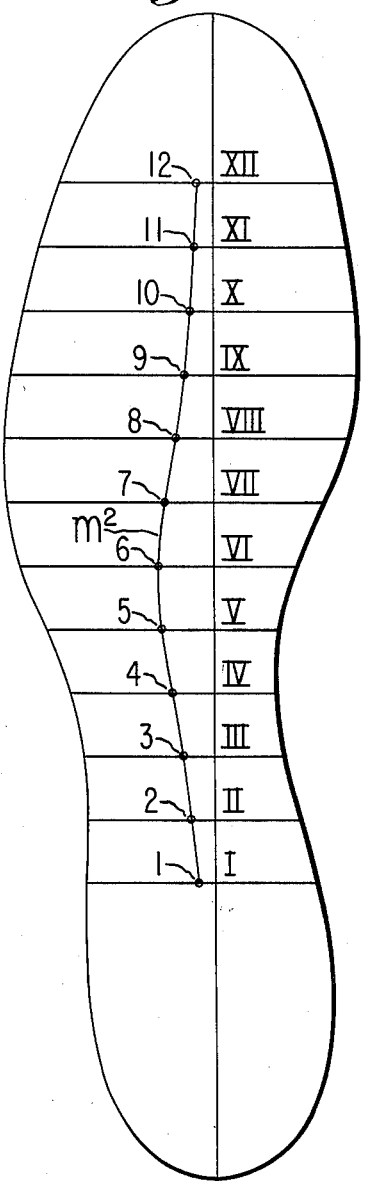

Referring to Figs. 13 and 14, the manner in which the mechanism for modifying the positioning effect of the pattern cam 422, so that the lasting units will be properly positioned for different sizes of shoes, will now be explained. For the purposes of this explanation, it will be assumed that the base size is No. 10, shown in Fig. 13, while the smallest size of shoe to be accommodated is No. 5 and shown in Fig. 14. It has already been pointed out that the lasting units are connected together for equal movements toward or away from each other and also, as the jack is moved to feed the shoe, that the shoe is shifted laterally, by the cam 472, so as to center the shoe relatively to the lasting devices. Thus the center, or median, line of the shoe bottom, designated by the reference characters $m^1$ and $m^2$, in Figs. 13 and 14, will be located midway between the lasting units and it is, accordingly, possible to so shape the pattern cam 422 that, with the roll 432 in alinement with the stud 438 and the effect of the pattern cam not modified by the action of the cam 407, the units will be properly positioned relatively to the opposite edges of the shoe bottom $s^1$, $s^1$, Fig. 13, at each of the twelve operating locations, indicated by the transverse lines numbered from I to XII.

It will be understood, when a smaller size shoe is being lasted, that the distance between the operating locations will be shortened, as in the prior machine, and also that the distance from the median line to the edge of the shoe will decrease. However, this decrease not only varies with different sizes but also is different at each operating location, as will be apparent by reference to the series of crosses $x$, $x$, $x$ which have been placed on the transverse lines of Fig. 13 and showing the distances from the median line to the edge of the size 5 shoe, shown in Fig. 14, at each operating location. It is, therefore, not only necessary to modify the positioning effect of the pattern cam in accordance with different sizes but also to vary this modification for each operating location.

In the herein illustrated mechanism, the last-mentioned function is obtained by means of the cam 407, which is provided with twelve cam surfaces 408 corresponding to the twelve operating locations, while the first-mentioned function is obtained by shifting the bar 430 to displace the roll 432 relatively to the stud 438 and thus to multiply the effect of the cam 407. Therefore, when operating on any size of shoe other than the base size No. 10, the bar 430 will be shifted so as to move the roll 432 away from the stud 438 a distance proportional to the length of the shoe from breast-line to tip-line and the positioning effect of the pattern cam 422 will be modified by subtracting therefrom the difference between the distance from the median line to the edge of the base size shoe and the distance from the median line to the edge of the size being lasted, at each operating location.

While in the herein illustrated machine, the largest size has been used as a base size and the accommodation for different sizes obtained by subtracting from the effect of the pattern cam 422, it will be obvious that the arrangement may readily be reversed, by changing the effect of the movement of the link 214 on the lasted units, and locating the roll 432 on the opposite side of the stud 438, so that the smallest size may be used as the base size without departing from the spirit of this invention. It will also be understood, while theoretically it would be necessary to change the cam 422, as well as the cam 407, for each different style of shoe, that, practically and inasmuch as a considerable limit of error in positioning the lasting units is permissible, one set of these cams may be used for a number of different styles which do not differ too radically in shape.

Having described the invention, what I claim as new and desire to secure by Letters Patent of the United States is:

1. A machine for lasting shoes having, in combination, a pair of devices for operating progressively along the opposite sides of the bottom of a shoe at the same time, a jack for supporting and feeding the shoe relatively to said devices, and automatic mechanism, having a single control element shaped in accordance with the style of the shoe for varying and determining the positions of both of said devices, laterally of the bottom of the shoe and independently of any guiding surfaces on the shoe itself, as the jack feeds the shoe to cause said devices to operate progressively along the opposite sides of the bottom of the shoe.

2. A machine for operating on shoes having, in combination, a pair of devices for operating progressively along the opposite sides of the bottom of a shoe at the same time, a jack for supporting and feeding the shoe relatively to said devices, and automatic mechanism having a single control cam shaped in accordance with the style of the shoe for varying and determining the positions of both of said devices, laterally of the bottom of the shoe and independently of any guiding surfaces on the shoe itself, as the jack feeds the shoe to cause said devices to operate progressively along the opposite sides of the bottom of a shoe.

3. A machine for lasting shoes having, in combination, a pair of lasting devices for operating progressively along the opposite sides of the bottom of a shoe at the same time, a jack for supporting and feeding the shoe relatively to said lasting devices, and automatic mechanism, having a single control cam shaped in accordance with the style of the shoe being lasted for varying and determining the positions of both of said lasting devices, laterally of the bottom of the shoe and independently of any guiding surfaces on the shoe itself, as the jack feeds the shoe to cause said lasting devices to operate progressively along the opposite sides of the bottom of the shoe.

4. A machine for operating on shoes having, in combination, a pair of devices for inserting fastenings progressively along the opposite sides of the bottom of a shoe at the same time, a jack for supporting and feeding the shoe relatively to said devices, and means, having a single control cam shaped in accordance with the style of the shoe for varying and determining the positions of both of said devices, laterally of the bottom of the shoe, and independently of any guiding surfaces on the shoe itself, as the jack feeds the shoe to cause said devices to operate progressively along the opposite sides of the bottom of the shoe.

5. A machine for lasting shoes having, in combination, a pair of devices for operating progressively along the opposite sides of the bottom of a shoe at the same time, a jack for supporting and feeding the shoe, relatively to said devices, and operable to center the longitudinal median line of the shoe bottom between said devices, and means controlled by a single element shaped in accordance with the style of the shoe, for varying and determining the positions of both of said devices, laterally of the bottom of the shoe and relatively to the longitudinal median line thereof, independently of any guiding surfaces on the shoe itself, as the jack feeds the shoe to cause said devices to operate progressively along the opposite sides of the bottom of the shoe.

6. A machine for operating on shoes having, in combination, a pair of devices for operating progressively along the opposite sides of the bottom of a shoe at the same time, a jack for supporting and feeding the shoe relatively to said devices, and operable to center the longitudinal median line of the shoe bottom between said devices, and means controlled by a cam shaped in accordance with the style of the shoe, for varying and determining the positions of both of said devices, laterally of the bottom of the shoe and relatively to the longitudinal median line thereof, independently of any guiding surfaces on the shoe itself, as the jack feeds the shoe to cause said devices to operate progressively along the opposite sides of the bottom of the shoe.

7. A machine for lasting shoes having, in combination, a pair of lasting devices for operating progressively along the opposite sides of the bottom of a shoe at the same time, a jack for supporting and feeding the shoe, relatively to said lasting devices, and operable to center the longitudinal median line of the shoe bottom between said devices, and means controlled by a cam shaped in accordance with the style of the shoe being lasted, for varying and determining the positions of both of said lasting devices, laterally of the bottom of the shoe and relatively to the longitudinal median line thereof, independently of any guiding surfaces on the shoe itself, as the jack feeds the shoe, to cause said lasting devices to operate progressively along the opposite sides of the bottom of the shoe.

8. A machine for operating on shoes having, in combination, a pair of devices for inserting fastenings progressively along the opposite sides of the bottom of a shoe at the same time, a jack for supporting and feeding the shoe, relatively to said devices, and operable to center the longitudinal median line of the shoe bottom between said devices, and means controlled by a cam shaped in accordance with the style of the shoe, for varying and determining the positions of both of said devices, laterally of the bottom of the shoe and relatively to the longitudinal median line thereof, independently of any guiding surfaces on the shoe itself, as the jack feeds the shoe to cause said devices to operate progressively along the opposite sides of the bottom of the shoe.

9. A machine for lasting shoes having, in combination, a pair of devices for operating progressively along the opposite sides of the bottom of a shoe at the same time, a jack for supporting and feeding the shoe, relatively to said devices, automatic mechanism, including an element shaped in accordance with the style of the shoe, for varying and determining the positions of both of said devices, laterally of the bottom of the shoe, as the jack feeds the shoe, and means for modifying the effect of said automatic positioning mechanism to accommodate shoes of different sizes.

10. A machine for operating on shoes having, in combination, a pair of devices for operating progressively along the opposite sides of the bottom of a shoe at the same time, a jack for supporting and feeding the shoe relatively to said devices, automatic mechanism, including a cam shaped in accordance with the style of the shoe, for varying and determining the positions of both of said devices, laterally of the bottom of the shoe, as the jack feeds the shoe, and means for modifying the effect of said automatic positioning mechanism to accommodate shoes of different sizes.

11. A machine for lasting shoes having, in combination, a pair of lasting devices for operating progressively along the opposite sides of the bottom of a shoe at the same time, a jack for supporting and feeding the shoe relatively to said lasting devices, automatic mechanism, including a cam shaped in accordance with the style of the shoe being lasted, for varying and determining the positions of both of said devices, laterally of the bottom of the shoe, as the jack feeds the shoe, and means for modifying the effect of said automatic positioning mechanism to accommodate shoes of different sizes.

12. A machine for operating on shoes having, in combination, a pair of devices for inserting fastenings progressively along the opposite sides of the bottom of a shoe at the same time, a jack for supporting and feeding the shoe relatively to said devices, automatic mechanism, including a cam shaped in accordance with the style of the shoe, for varying and determining the positions of both of said devices, laterally of the bottom of the shoe, as the jack feeds the shoe, and means for modifying the effect of said automatic positioning mechanism to accommodate shoes of different sizes.

13. A machine for operating on shoes having, in combination, a pair of devices for operating progressively along the opposite sides of the bottom of a shoe at the same time, a jack for supporting and feeding the shoe, relatively to said devices, and operable to center the longitudinal median line of the shoe bottom between said devices, automatic mechanism for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

14. A machine for lasting shoes having, in combination, a pair of lasting devices for operating progressively along the opposite sides of the bottom of a shoe at the same time, a jack for supporting and feeding the shoe, relatively to said lasting devices, and operable to center the longitudinal median line of the shoe bottom between said devices, automatic mechanism for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

15. A machine for operating on shoes having, in combination, a pair of devices for inserting fastenings along the opposite sides of the bottom of a shoe at the same time, a jack for supporting and feeding the shoe, relatively to said devices, and operable to center the longitudinal median line of the shoe bottom between said devices, automatic mechanism for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

16. A machine for lasting shoes having, in combination, a pair of devices for operating progressively along the opposite sides of the bottom of a shoe at the same time, a jack for supporting and feeding the shoe and operable to center the longitudinal median line of the shoe bottom between said devices, automatic mechanism, including an element shaped in accordance with the style of the shoe, for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

17. A machine for operating on shoes having, in combination, a pair of devices for operating progressively along the opposite sides of the bottom of a shoe at the same time, a jack for supporting and feeding the shoe and operable to center the longitudinal median line of the shoe bottom between said devices, mechanism, including a cam shaped in accordance with the style of the shoe, for varying and determining the positions of both of said devices, laterally of the bottom of the shoe and relatively to the longitudinal median line thereof, as the jack feeds the shoe, and means for modifying the effect of said automatic positioning means to accommodate shoes of different sizes.

18. A machine for lasting shoes having, in combination, a pair of lasting devices for operating progressively along the opposite sides of the bottom of a shoe at the same time, a jack for supporting and feeding the shoe and operable to center the longitudinal median line of the shoe bottom between said devices, automatic mechanism, including a cam shaped in accordance with the style of the shoe being lasted, for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

19. A machine for operating on shoes having, in combination, a pair of devices for inserting fastenings progressively along the opposite sides of the bottom of a shoe at the same time, a jack for supporting and feeding the shoe and operable to center the longitudinal median line of the shoe bottom between said devices, automatic mechanism, including a cam shaped in accordance with the style of the shoe, for varying and determining the positions of both of said devices, laterally of the bottom of the shoe and relatively to the longitudinal median line thereof, as the jack feeds the shoe, and means for modifying the effect of said automatic positioning mechanism to accommodate shoes of different sizes.

20. A machine for operating on shoes having, in combination, a pair of devices for operating progressively along the opposite sides of the bottom of a shoe at the same time, a jack for supporting the shoe arranged for manual movement to position the shoe, in a lengthwise direction relatively to said devices, and thereafter, for power movement to feed the shoe, automatic mechanism for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

21. A machine for lasting shoes having, in combination, a pair of lasting devices for operating progressively along the opposite sides of the bottom of a shoe at the same time, a jack for supporting the shoe arranged for manual movement to position the shoe, in a lengthwise direction relatively to the lasting devices, and thereafter, for power movement to feed the shoe, automatic mechanism for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

22. A machine for operating on shoes having, in combination, a pair of devices for inserting fastenings progressively along the opposite sides of the bottom of a shoe at the same time, a jack for supporting the shoe arranged for manual movement to position the shoe, in a lengthwise direction relatively to the devices, and thereafter, for movement to feed the shoe, automatic mechanism for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

23. A machine for lasting shoes having, in combination, a pair of lasting devices for operating progressively along the opposite sides of the bottom of a shoe at the same time, a jack for supporting the shoe arranged for manual movement to position the shoe, in a lengthwise direction, relatively to the lasting devices and, thereafter, for power movement to feed the shoe, automatic mechanism, including an element shaped in accordance with the style of the shoe being lasted, for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

24. A machine for operating on shoes having, in combination, a pair of devices for operating progressively along the opposite sides of the bottom of a shoe at the same time, a jack for supporting the shoe arranged for manual movement to position the shoe, in a lengthwise direction, relatively to said devices, and, thereafter, for power movement to feed the shoe, automatic mechanism, including a cam shaped in accordance with the style of the shoe, for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

25. A machine for lasting shoes having, in combination, a pair of lasting devices for operating progressively along the opposite sides of the bottom of a shoe at the same time, a jack for supporting the shoe arranged for manual movement to position the shoe, in a lengthwise direction, relatively to the lasting devices, and, thereafter, for power movement to feed the shoe, automatic mechanism, including a cam shaped in accordance with the style of the shoe being lasted, for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

26. A machine for lasting shoes having, in combination, a pair of devices for inserting fastenings progressively along the opposite sides of the bottom of a shoe at the same time, a jack for supporting the shoe arranged for manual movement to position the shoe, in a lengthwise direction relatively to said lasting devices, and, thereafter, for power movement to feed the shoe, automatic mechanism, including a cam shaped in accordance with the style of the shoe, for varying and determining the positions of both of said devices, laterally of the bottom of the shoe, as the jack feeds the shoe, and means, adjustable by said manual movement of the jack, for modifying the effect of said automatic positioning mechanism to accommodate shoes of different sizes.

27. A machine for operating on shoes having, in combination, a pair of devices for operating progressively along the opposite sides of the bottom of a shoe at the same time, a jack for supporting the shoe, operable to center the longitudinal median line of the shoe bottom between said devices and arranged for manual movement, in a lengthwise direction, relatively to the devices, and, thereafter, for power movement to feed the shoe, automatic mechanism for varying and determining the positions of both of said devices, laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

28. A machine for lasting shoes having, in combination, a pair of lasting devices for operating progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to the lasting devices and, thereafter, for power movement to feed the shoe, automatic mechanism for varying and determining the positions of both of said devices, laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

29. A machine for operating on shoes having, in combination, a pair of devices for inserting fastenings progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to said devices, and, thereafter, for power movement to feed the shoe, automatic mechanism for varying and determining the positions of both of said devices, laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

30. A machine for lasting shoes having, in combination, a pair of lasting devices for operating progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to the lasting devices and, thereafter, for power movement to feed the shoe, automatic mechanism, including an element shaped in accordance with the style of the shoe being lasted, for varying and determining the positions of both of said devices, laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

31. A machine for operating on shoes having, in combination, a pair of devices for operating progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to said devices and, thereafter, for power movement to feed the shoe, automatic mechanism, including a cam shaped in accordance with the style of the shoe, for varying and determining the positions of both of said devices laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

32. A machine for lasting shoes having, in combination, a pair of lasting devices for operating progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to the lasting devices and, thereafter, for power movement to feed the shoe, automatic mechanism, including a cam shaped in accordance with the style of the shoe being lasted, for varying and determining the positions of both of said devices laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

33. A machine for operating on shoes having, in combination, a pair of devices for inserting fastenings progressively along the opposite sides of the bottom of a shoe at the same time, a jack for supporting the shoe, operable to center the longitudinal median line of the shoe bottom between said devices and arranged for manual movement to position the shoe, in a lengthwise direction, relatively to said devices, and, thereafter, for power movement to feed the shoe, automatic mechanism, including a cam shaped in accordance with the style of the shoe, for varying and determining the positions of both of said devices laterally of the bottom of the shoe and relatively to the longitudinal median line thereof, as the jack feeds the shoe, and means, adjustable by said manual movement of the jack, for modifying the effect of said automatic positioning mechanism to accommodate shoes of different sizes.

34. A machine for lasting shoes having, in combination, a pair of lasting devices for operating progressively along the opposite sides of the bottom of a shoe at the same time, each of said devices including means for inserting fastenings to secure the lasting margin of the upper to the insole, a jack for supporting and feeding the shoe, and means for automatically rendering said fastening-inserting means inoperative when the lasting devices are operating along selected portions of the shoe bottom.

35. A machine for lasting shoes having, in combination, a pair of lasting devices for operating progressively along the opposite sides of the bottom of a shoe at the same time, each of said devices including means for inserting tacks to secure the lasting margin of the upper to the insole, a jack for supporting and feeding the shoe, and means for automatically rendering said tack-inserting means inoperative when the lasting devices are operating along selected portions of the shoe bottom.

36. A machine for lasting shoes having, in combination, a pair of lasting devices for operating progressively along the opposite sides of the bottom of a shoe at the same time, each of said devices including upper-tensioning means and fastening-inserting means, a jack for supporting and feeding the shoe, and cam-controlled mechanism for automatically rendering said fastening-inserting means inoperative when said devices are operating along selected portions of the shoe bottom.

37. A machine for lasting shoes having, in combination, a pair of lasting devices for operating progressively along the opposite sides of the bottom of a shoe at the same time, each of said devices including upper-tensioning means and tack-inserting means, a jack for supporting and feeding the shoe, and cam-controlled mechanism for automatically rendering said tack-inserting means inoperative when said devices are operating along selected portions of the shoe bottom.

38. A machine for lasting shoes having, in combination, a pair of lasting devices for operating progressively along the opposite sides of the bottom of a shoe at the same time, each of said devices including an overlaying member and means for inserting fastenings through said member to secure the lasting margin of the upper to the insole, a jack for supporting and feeding the shoe, and means for automatically rendering said fastening-inserting means inoperative when said devices are operating along selected portions of the shoe bottom.

39. A machine for lasting shoes having, in combination, a pair of lasting devices for operating progressively along the opposite sides of the bottom of a shoe at the same time, each of said devices including an overlaying member and means for inserting tacks through said member to secure the lasting margin of the upper to the insole, a jack for supporting and feeding the shoe, and means for automatically rendering said tack-inserting means inoperative when said devices are operating along selected portions of the shoe bottom.

40. A machine for lasting shoes having, in combination, a pair of lasting devices for operating progressively along the opposite sides of the bottom of a shoe at the same time, each of said devices including an overlaying member and means for inserting fastenings through said member to secure the lasting margin of the upper to the insole, a jack for supporting and feeding the shoe, and cam-controlled mechanism for automatically rendering said fastening-inserting mechanism inoperative when said devices are operating along selected portions of the shoe bottom.

41. A machine for lasting shoes having, in combination, a pair of lasting devices for operating progressively along the opposite sides of the bottom of a shoe at the same time, each of said devices including an overlaying member and means for inserting tacks through said member to secure the lasting margin of the upper to the insole, a jack for supporting and feeding the shoe, and cam-controlled mechanism for automatically rendering said tack-inserting means inoperative when said devices are operating along selected portions of the shoe bottom.

42. A machine for lasting shoes having, in combination, a pair of lasting devices for operating progressively along the opposite sides of the bottom of a shoe at the same time, each of said lasting devices including an overlaying member, a hammer and means for supplying fastenings to said overlaying member to be driven by said hammer, a jack for supporting and feeding the shoe, and means for rendering said fastening-supplying means inoperative when the lasting devices are operating along selected portions of the shoe bottom.

43. A machine for lasting shoes having, in combination, a pair of lasting devices for operating progressively along the opposite sides of the bottom of a shoe at the same time, each of said lasting devices including an overlaying member, a hammer and means for supplying tacks to said overlaying member to be driven by said hammer, a jack for supporting and feeding the shoe, and means for rendering said tack-supplying means inoperative when the lasting devices are operating along selected portions of the shoe bottom.

44. A machine for lasting shoes having, in combination, a pair of lasting devices for operating progressively along the opposite sides of the bottom of a shoe at the same time, each of said lasting devices including an overlaying member, a hammer and means for supplying fastenings to said overlaying member to be driven by said hammer, a jack for supporting and feeding the shoe, and cam-controlled mechanism for rendering said fastening-supplying means inoperative when the lasting devices are operating along selected portions of the shoe bottom.

45. A machine for lasting shoes having, in combination, a pair of lasting devices for operating progressively along the opposite sides of the bottom of a shoe at the same time, each of said lasting devices including an overlaying member, a hammer and means for supplying fastenings to said overlaying member to be driven by said hammer, a jack for supporting and feeding the shoe, and cam-controlled mechanism for rendering said tack-supplying means inoperative when the lasting devices are operating along selected portions of the shoe bottom.

46. A machine for lasting shoes having, in combination, a pair of lasting devices for operating progressively along the opposite sides of the bottom of a shoe at the same time, each of said lasting devices including an overlaying member, a hammer, for driving fastenings through said overlaying member, arranged to strike said overlaying member a sharp blow for pressing the upper against the insole and means for supplying fastenings to the overlaying member, a jack for supporting and feeding the shoe, and means for rendering said fastening-supplying means inoperative when the lasting devices are operating along selected portions of the shoe bottom.

47. A machine for lasting shoes having, in combination, a pair of lasting devices for operating progressively along the opposite sides of the bottom of a shoe at the same time, each of said lasting devices including an overlaying member, a hammer, for driving tacks through said overlaying member arranged to strike said overlaying member a sharp blow for pressing the upper against the insole and means for supplying tacks to said overlaying member, a jack for supporting and feeding the shoe, and means for rendering said tack-supplying means inoperative when the lasting devices are operating along selected portions of the shoe bottom.

48. A machine for lasting shoes having, in combination, a pair of lasting devices for operating progressively along the opposite sides of the bottom of a shoe at the same time, each of said lasting devices including an overlaying member, a hammer, for driving fastenings through said overlaying member, arranged to strike said overlaying member a sharp blow for pressing the upper against the insole and means for supplying fastenings to the overlaying member, a jack for supporting and feeding the shoe, and cam-controlled means for rendering said fastening-supplying means inoperative when the lasting devices are operating along selected portions of the shoe bottom.

49. A machine for lasting shoes having, in combination, a pair of lasting devices for operating progressively along the opposite sides of the bottom of a shoe at the same time, each of said lasting devices including an overlaying member, a hammer, for driving tacks through said overlaying member, arranged to strike said overlaying member a sharp blow for pressing the upper against the insole and means for supplying tacks to the overlaying member, a jack for supporting and feeding the shoe, and cam-controlled mechanism for rendering said tack-supplying means inoperative when the lasting devices are operating along selected portions of the shoe bottom.

ROBERT H. LAWSON.

REFERENCES CITED

The following references are of record in the file of this patent:

UNITED STATES PATENTS

| Number | Name | Date |
| --- | --- | --- |
| 9,629 | Tripp | Apr. 12, 1853 |
| 467,877 | Patten | Jan. 26, 1892 |
| 502,828 | Patten | Aug. 8, 1893 |
| 696,740 | Ladd | Apr. 1, 1902 |
| 893,440 | Carter | July 14, 1908 |
| 1,030,822 | Keith | June 25, 1912 |
| 1,118,484 | Fowler | Nov. 24, 1914 |
| 1,125,620 | Winkley | Jan. 19, 1915 |
| 1,129,373 | Winkley | Feb. 23, 1915 |
| 1,401,167 | Macleod | Dec. 27, 1921 |
| 2,101,041 | Blanchard | Dec. 7, 1937 |
| 2,201,866 | Lawson | May 21, 1940 |
| 2,251,285 | Kamborian | Aug. 5, 1945 |